US005302080A

United States Patent [19]

Smith et al.

[11] Patent Number: 5,302,080

[45] Date of Patent: Apr. 12, 1994

[54] METHOD AND APPARATUS FOR STACKING NON-SYMMETRICAL FLEXIBLE ARTICLES

[75] Inventors: David A. Smith, Midland; Robert J. Nestle, Essexville, both of Mich.

[73] Assignee: Dowbrands L.P., Indianapolis, Ind.

[21] Appl. No.: 838,621

[22] Filed: Feb. 19, 1992

[51] Int. Cl.[5] .......... B65G 57/16

[52] U.S. Cl. .......... 414/788.2; 414/790.8; 414/790.9; 414/786; 414/924; 271/214

[58] Field of Search .......... 414/790.8, 790.9, 788.2, 414/786, 788.9, 923, 924, 926; 271/214, 148; 406/87, 172

[56] References Cited

U.S. PATENT DOCUMENTS

| | | | |
|---|---|---|---|
| 2,471,066 | 5/1949 | Hesson | 271/148 |
| 2,731,159 | 1/1956 | Donehower | 414/788.2 |
| 3,446,500 | 5/1969 | Meier | 271/148 |
| 3,567,216 | 3/1971 | Zeller | 271/148 |
| 3,622,151 | 11/1971 | Range et al. | 406/87 |
| 3,659,727 | 5/1972 | Pearsall | 414/788.2 |
| 3,889,824 | 6/1975 | Wood | 414/790.8 X |
| 3,890,508 | 6/1975 | Sharp | 406/87 X |
| 3,892,168 | 7/1975 | Grobman | 414/790.8 X |
| 3,908,985 | 9/1975 | Wiseman | 414/790.8 X |
| 4,043,458 | 8/1977 | Schott, Jr. | 414/789 X |
| 4,195,960 | 4/1980 | Schulze | 414/790.7 |
| 4,516,895 | 5/1985 | Hall | 414/789.9 |
| 4,526,639 | 7/1985 | Reimann | 156/182 |
| 4,692,134 | 9/1987 | dos Santos Copia | 493/196 |
| 4,932,435 | 7/1990 | Koneisel et al. | 139/504 |

FOREIGN PATENT DOCUMENTS 1341132 9/1987 U.S.S.R. .

*Primary Examiner*—D. Glenn Dayoan
*Assistant Examiner*—Dean A. Reichard

[57] ABSTRACT

A method and apparatus for stacking zippered plastic bags maintains the top bag of the stack in a generally horizontal relationship by controlling the position of a stacking table which supports the stack. At least a portion of the stacking table which supports the stack is gradually pivoted in the area of the bag zippers as a stack forms. Preferably, the stacking table is controlled to also maintain the top of the stack at a generally constant level while the stack is forming.

29 Claims, 8 Drawing Sheets

METHOD AND APPARATUS FOR STACKING NON-SYMMETRICAL FLEXIBLE ARTICLES

BACKGROUND OF THE INVENTION

The present invention relates generally to a method and apparatus for stacking non-symmetrical flexible articles. More particularly, it relates to a method and apparatus for stacking zippered plastic bags to maintain the top bag in a generally horizontal relationship.

In the production of individual flexible articles such as plastic bags and containers, zippered bag stock is typically supplied in the form of a continuous web of thermoplastic material having mating zipper elements near opposite edges thereof. The continuous web is folded upon itself to form two plies and to bring the zipper elements into opposing relationship. The folded web is thereafter severed to form individual plastic bags and containers from portions thereof. Typically, severing is achieved by use of hot wires, which simultaneously sever and seal the bag sides. The plastic bags are then stacked, counted, and packaged by packing equipment.

The severing and sealing operation typically takes place on a relatively large diameter rotating seal drum which includes a plurality of hot wire elements disposed in grooves along its outer periphery for severing and sealing. See, for example, Tumminia, U.S. Pat. No. 4,369,449, assigned to the same assignee as the present invention. As the seal drum rotates, the heated wires are sequentially raised to the surface to sever and seal a respective portion or the web and form a bag therefrom. The individual bags are retained on the seal drum by a vacuum arrangement as the seal drum rotates.

As the seal drum continues to rotate, the bags formed thereon are released and transferred to a smaller transfer drum, also typically equipped with vacuum capabilities. Transfer is accomplished by relieving the vacuum on the seal drum at an appropriate point to allow the bags to fall onto the transfer drum where they are, in turn, secured by vacuum. As the transfer drum rotates, its vacuum is relieved and the individual bags are stripped therefrom by an orbital packer or similar device. The orbital packer delivers the bags to a delivery point where they are stacked. Stacks of bags are thereafter transferred for packaging.

An orbital packer typically includes a plurality of packer fingers which move in a generally circular path in time with the transfer drum to remove successive bags therefrom for stacking. Typically, the first few bags of a stack are initially stacked on count fingers while the preceding stack is being removed. Thereafter, the stacking table, typically comprised of a plurality of fingers which nest with the count fingers, receives the bags from the count fingers. The count fingers retract and the stack continues to form on the stacking table. When a predetermined quantity of bags is reached, typically 25, the count fingers again fire into the stack to separate the stack just formed from the continuous stream of bags, allowing removal of the stack while the first several bags forming a new stack are received from the orbital packer on the count fingers. The process then continues to repeat, as described above. The stack formed on the stacking table is removed by a horizontal transfer mechanism, such as disclosed by Smith, U.S. Pat. No. 4,588,070, assigned to the same assignee as the present invention.

A number of problems have been encountered in the production of such thermoplastic bags. Stacking problems, such as quality and neatness of stacking, have long been experienced with thermoplastic bags on commercial, high speed stacking machinery, regardless of the manner of production. Bags have been difficult to stack due to their flexibility, and due to their slippery surfaces which are encouraged to aid in extrusion and film forming processes. Non-symmetrical flexible articles, such as zippered plastic bags, add to the difficulty with stacking. For example, a typical stack of 25 zippered plastic bags may be 2.0 inches or more thick at the zippered end (25 times the profile thickness), while being only 0.10 to 0.20 inches thick at the opposite end (25 times the bag film thickness). During stacking, the uppermost bags in the stack are frequently disturbed by the act of stripping bags from the transfer drum and depositing them onto the stack. Gravity and the impact of the bag being stacked typically cause the uppermost bags to slide down the stack towards the end opposite the zipper, producing a stack of shingled, rather than stacked, bags. In addition, where zippered bags are being stacked, due to the height of the stack formed thereby, the count fingers occasionally strike a zipper and attempt to drive the bag ahead, which in turn may crumple the bag and cause jamming.

Some attempts to solve this problem include using a fixed position, two-level stacking table with a lowered region at the zippered end of the stack. This type of table is limited to a height difference of only ¼ inch to ½ inch, while the difference in stack height may be as much as 1.8–1.9 inches. The limitation arises because the stack is lowered onto the table when it is approximately half completed. If the height difference were any greater on such a two-level table, the stack might droop or fall through the table fingers and cause a jam.

Accordingly, the need remains for an improved apparatus and method for accurate high speed stacking of non-symmetrical articles.

SUMMARY OF THE INVENTION

The present invention satisfies this need by providing an improved apparatus and method for stacking zippered plastic bags. The apparatus of the present invention includes means for delivering a series of individual zippered plastic bags to a delivery point, and means at the delivery point for receiving successive zippered plastic bags in a stacked relationship. The receiving means includes means for supporting the bags. The apparatus further includes means for controlling the position of the supporting means such that, as the bags are delivered to the delivery point, the last bag in a series, i.e. the uppermost bag in the stack, is continuously maintained in a substantially horizontal position at the delivery point. Reference to zippered plastic bags includes, generally, plastic bags having interlocking closures which make the bags thicker at the closure end than at the other end.

In accordance with the present invention, three embodiments are disclosed which provide control over the means for supporting and maintain the last bag in a series uppermost on the stack in a substantially horizontal position.

In a first embodiment, the supporting means, such as a stacking table, is pivotally mounted on the receiving means, and the controlling means include means for pivoting the supporting means downwardly. So constructed, the supporting means can be tilted gradually in a downward direction as successive bags are deposited on the stack, to accommodate the difference in thickness between the bag ends, and to maintain the uppermost bag in a substantially horizontal position.

In the second and third embodiments of the present invention, the supporting means include first means for supporting the nonzippered portion of the bags and second means for supporting the zippered portion of the bags.

More particularly, in the second embodiment. The first supporting means, such as a portion of a stacking table, is pivotally mounted on the receiving means, and the second supporting means, such as an end portion of a stacking table, is pivotally mounted on the first supporting means. The means for controlling of the second embodiment include means for pivoting the first and second supporting means downwardly. To maintain the substantially horizontal position of the last bag in a series, such as the uppermost bag in a stack, the controlling means operate so that the rate of downward movement of the second supporting means is greater than the rate of downward movement of the first supporting means.

The third embodiment of the present invention is preferred. In accordance therewith, the first supporting means, such as a portion of a stacking table, is maintained in a generally horizontal attitude while the second supporting means moves downward therefrom. The first means for supporting does not pivot downward. The second means for supporting comprises an end portion of the stacking table, which preferably comprises only the last finger thereof, referred to as the zipper finger. The second means for supporting is pivotally mounted, or alternatively, slidably mounted, to the first means for supporting. The means for controlling include means for pivoting the second supporting means downwardly in a generally vertical direction, or alternatively, means for sliding the second supporting means downward therefrom.

In accordance with all embodiments of the present invention, the means for controlling also preferably includes means for displacing the means for supporting vertically. The means for displacing, which are in addition to means for pivoting or means for sliding, serve to gradually lower the receiving means to maintain the uppermost bag in the stack at a generally constant height as the stack forms. Thus, the stack does not increase in height relative to the means for delivering, thus avoiding potential interference therewith, and bags delivered to the delivery point drop only a predetermined distance to the stack along side guides, avoiding stacking irregularities and jamming.

Thus, as preferred in accordance with the third embodiment, where the controlling means include means for displacing and means for pivoting, the rate of downward movement of the second supporting means is greater than the rate of downward movement of the first supporting means. This, again, maintains the last of a series of bags being stacked, i.e. the uppermost bag on the stack, in a substantially horizontal position.

The third embodiment of the present invention is preferred for a number of reasons. Maintaining the first supporting means in a generally horizontal attitude facilitates transfer of the first few bags from the count fingers to the stacking table. Further, maintaining the first supporting means in a generally horizontal attitude allows the stacks formed thereon to be removed by existing horizontal transfer mechanisms for packaging without further modification. Tilting movements by the supporting means of the first and second embodiments, although effective in achieving the objects of the present invention, also add an additional opportunity for poor transfer of bags and jamming of the apparatus. In the first and second embodiments, where the supporting means are at a maximum angle of tilt at the time of transfer, the horizontal transfer mechanism must be modified to tilt to receive the stack of bags therefrom.

Additional features may be provided in accordance with the present invention. Regardless of the embodiment, the supporting means of the apparatus may include means for retaining the bottom bag in a stack at a predetermined location. The means for retaining may be one or more vacuum ports which are preferably located near the zipper end of the bottom bag on the supporting means. The vacuum port secures the portion of the bottom bag near the zipper end to insure that no portion of the stack falls through the fingers of the stacking table as the support means pivot or move further downward. It is also preferred to supply the vacuum port with low pressure purge air during the non-stacking, non-vacuum portion of the cycle to prevent the build-up of wax and other deposits which might plug up the vacuum port. Another feature, a jam detector, is preferably provided in the means for controlling.

The present invention also provides a method for stacking zippered plastic bags in a generally horizontal relationship. The method includes the steps of delivering a series of individual zippered bags to a delivery point; receiving the bags at the delivery point with a means for receiving, where the receiving means includes a means for supporting the bags; stacking the bags on the receiving means, and controlling the position of the supporting means so that the uppermost bag of the partial or completed stack is maintained in a substantially horizontal position at the delivery point. Thus, as the bags are delivered to the delivery point, the last in the series of bags on the stack is maintained in a substantially horizontal position at the delivery point.

In accordance with the first embodiment of the present invention, where the supporting means is pivotally mounted on the receiving means, the step of controlling the position of the supporting means further comprises the step of pivoting the supporting means downwardly.

In accordance with the second and third embodiments of the present invention, where the supporting means include first means for supporting the nonzippered portion of the bags and second means for supporting the zippered portion of the bags, it is preferred that the step of controlling the position of the supporting means further comprises the step of controlling the rate of downward movement of the second supporting means such that it is greater than the rate of downward movement of the first supporting means.

Accordingly, it is an object of the present invention to provide a method and apparatus for stacking asymmetrical flexible articles.

It is a further object of the present invention to provide a method and apparatus for stacking zippered plastic bags to maintain the top bag of a stack in a generally horizontal position.

It is a further object of the present invention to provide a method and apparatus for stacking zippered plastic bags so that each bag of a series is in a generally horizontal position when delivered to the stack at a delivery point, and to maintain at least the last bag of a series on the stack in a generally horizontal position by lowering the means for supporting the stack of bags to provide greater downward displacement of the zippered end of the bag.

It is a further object of the present invention to provide a method and apparatus for stacking zippered plastic bags to lower the means for supporting the stack of bags so that sufficient downward displacement of the zippered end of the bag is provided to facilitate insertion of count fingers in the stream of bags without disrupting the bags already stacked.

It is a further object of the present invention to provide a method and apparatus for improved stacking of zippered plastic bags which maintains at least the last bag of a series on a stack in a generally horizontal position but which requires a minimum of modification to downstream machine elements.

DETAILED DESCRIPTION OF THE PREFERRED EMBODIMENTS

Figure 1:
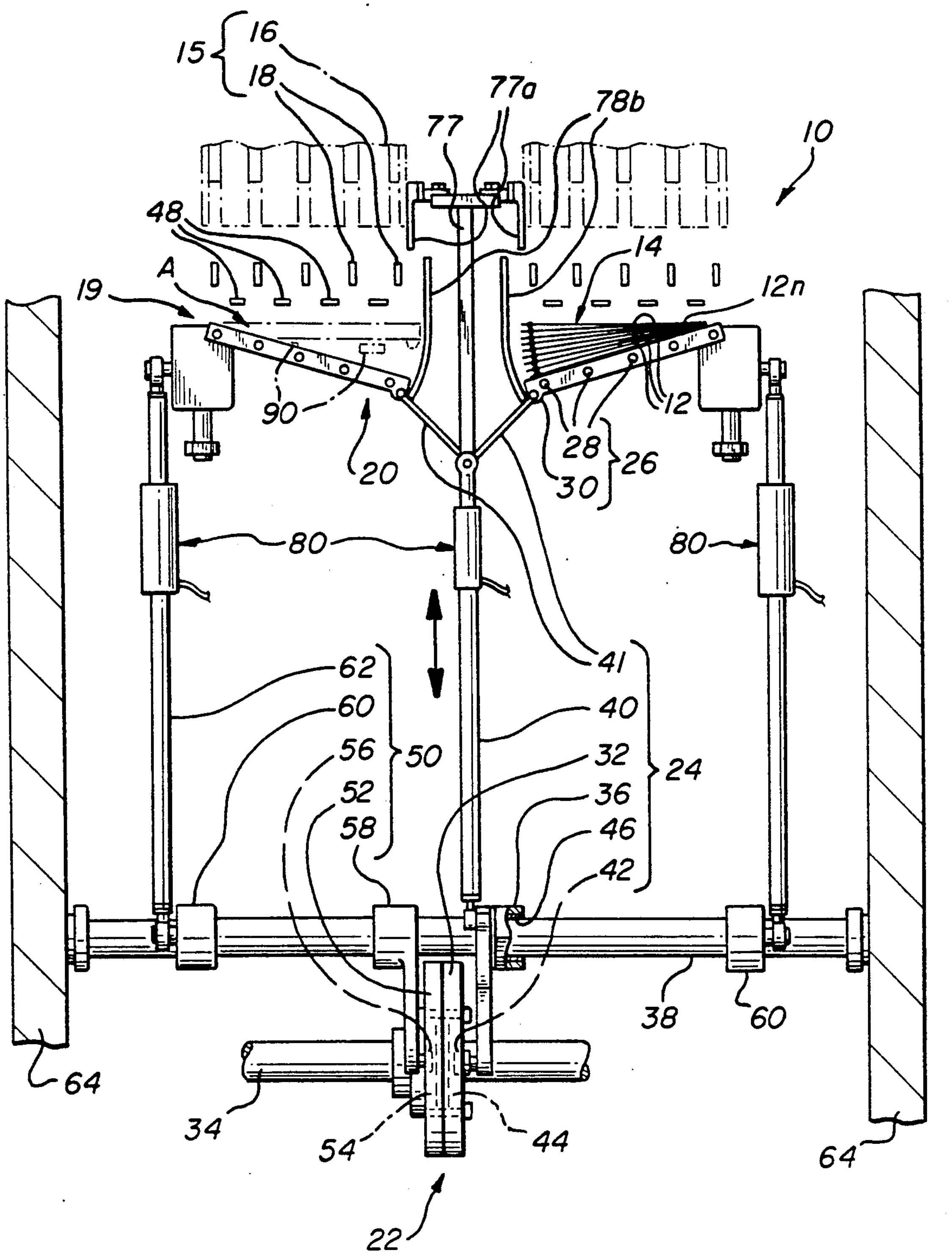
FIG. 1 is a front elevational view of a first embodiment of the apparatus of the present invention.
Figure 2A:
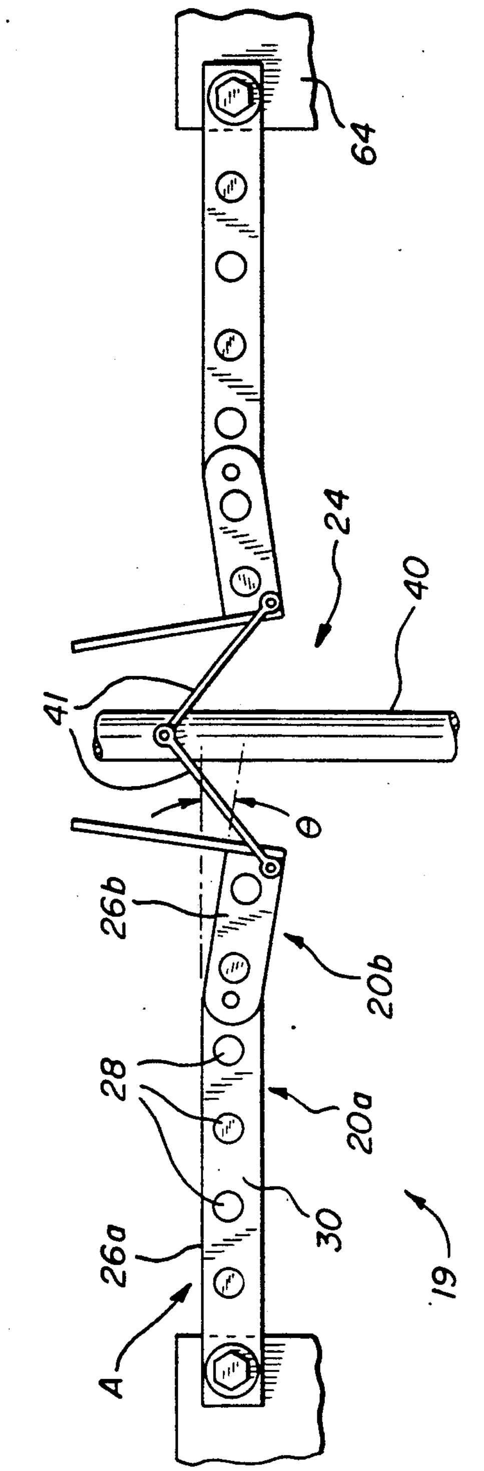
FIG. 2A is a front elevational view of a second embodiment of the apparatus of the present invention in its highest position.
Figure 2B:
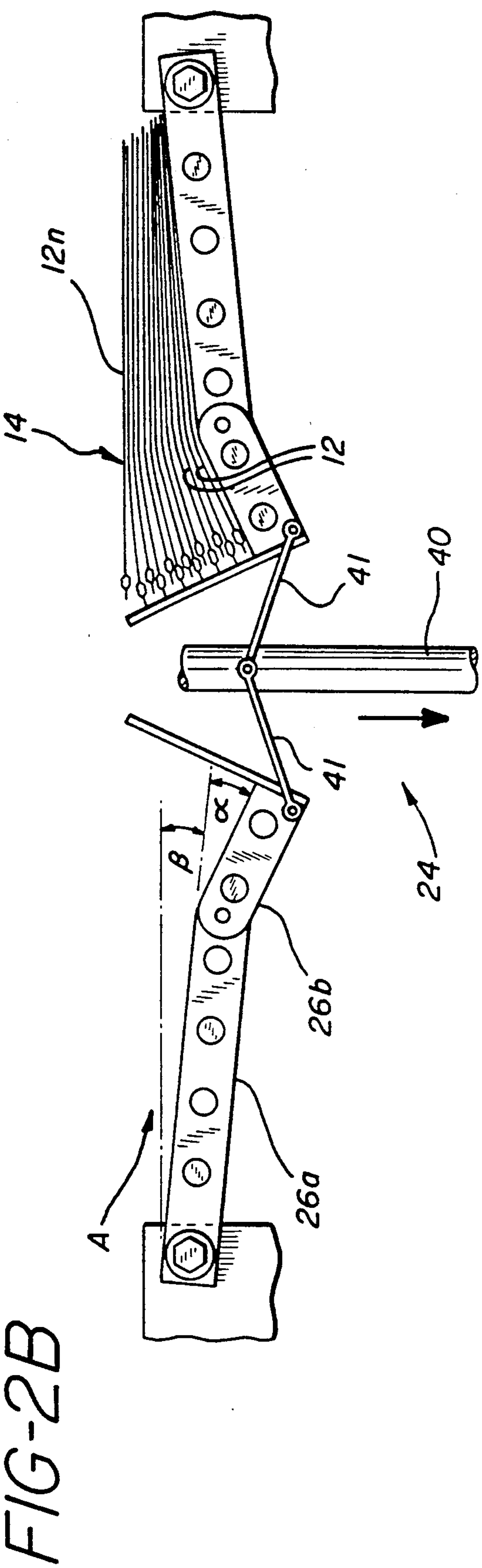
FIG. 2B is a front elevational view of the apparatus of FIG. 2A in its lowest position.
Figure 3:
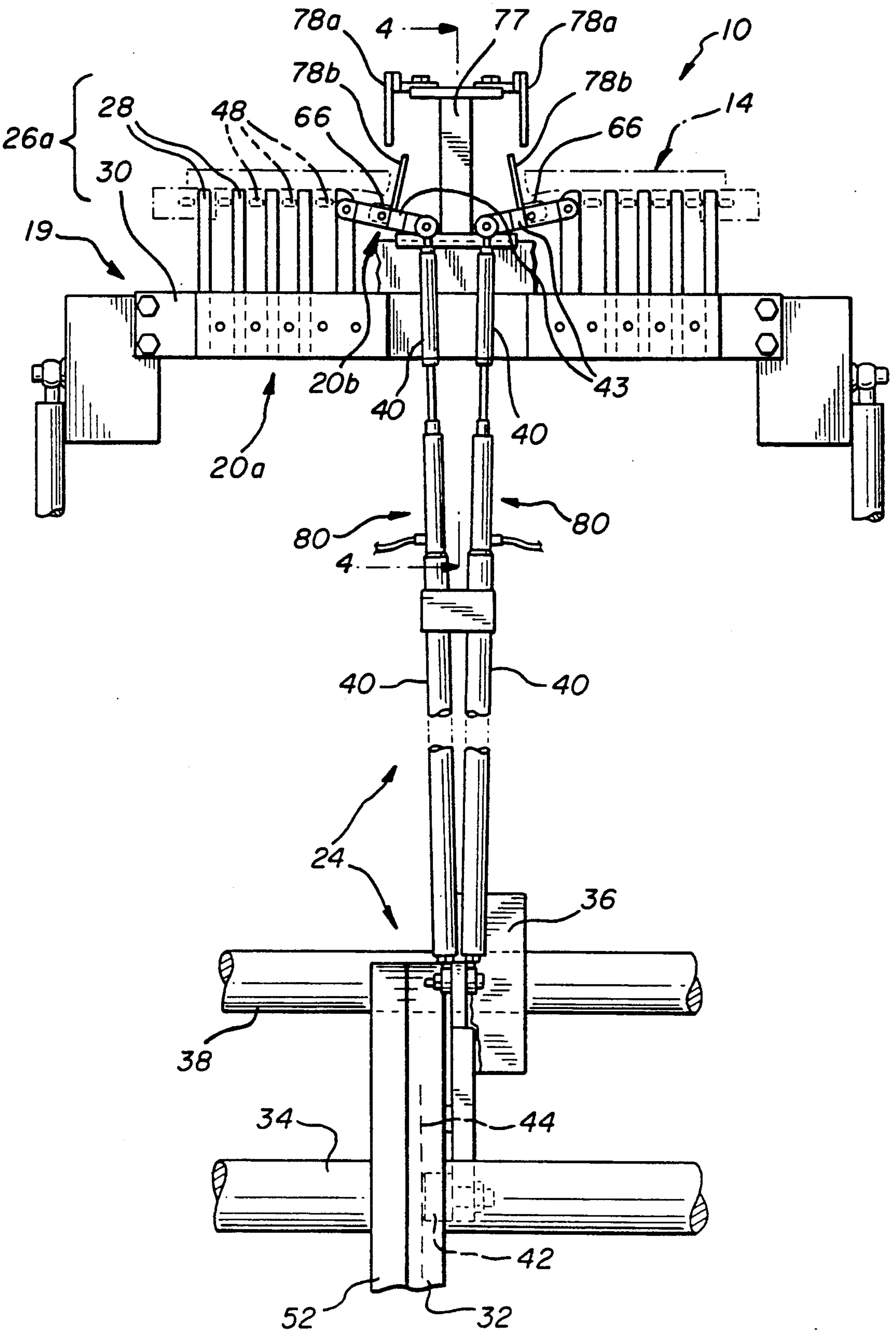
FIG. 3 is a front elevational view of a third embodiment of the apparatus of the present invention.

Referring to FIGS. 1-3, the apparatus 10 of the present invention for stacking zippered plastic bags 12 into stacks 14 is shown. The apparatus 10 includes means 15 for delivering a series of individual zippered plastic bags 12 to a delivery point A. Means 15 for delivering are shown representatively as a transfer drum 16 and an orbital packer 18. The apparatus 10 further includes means 19 for receiving successive zippered plastic bags 12 in a stacked relationship at delivery point A. The receiving means 19 includes means 20 for supporting the bags. Means 22 for controlling the position of the supporting means 20 maintain the bags 12 delivered to delivery point A such that the uppermost bag 12$n$ in the stack 14 is in a substantially horizontal position at the delivery point A. As shown in FIG. 1, preferably, the means 19 for receiving is adapted for use with a dual lane bag-making apparatus. However, the present invention may also be used with single lane or other multiple lane apparatuses. Three embodiments of the apparatus 10 of the present invention are set forth in greater detail below.

FIG. 1 shows the first embodiment of the present invention. The supporting means 20 is pivotally mounted on the receiving means 19, and the controlling means 22 include means 24 for pivoting the supporting means 20 downwardly. In accordance with the first embodiment of the present invention, the supporting means 20 is tilted gradually in a downward direction by the means 24 for pivoting as successive bags 12 are deposited on the stack 14. This downward motion compensates for the difference in thickness between the bag ends, which may be as much as 1.8-1.9 inches, and maintains the uppermost bag 12$n$ in a substantially horizontal position.

The supporting means 20 in the first embodiment is preferably a stacking table 26 having fingers 28 supported by a table frame 30. In FIG. 1, the fingers 28 extend back into the page of FIG. 1, somewhat like a comb. The fingers 28 are shown as circular in cross-section, but may have a semi-circular, triangular or rectangular cross-section to present a flat surface to the bags being stacked and to promote frictional contact therewith. The circular cross-section is preferred to prevent interference between the count fingers 48 and the fingers 28 of the stacking table 26 during initial transfer of bags 12 from the count fingers 48 to the stacking table 26, when the count fingers 48 are positioned between the fingers 28. During transfer the stacking table 26 begins to pivot downward, and possible interference and jamming of the fingers 28 and count fingers 48 is avoided by properly shaped and positioned fingers 28.

Figure 5:
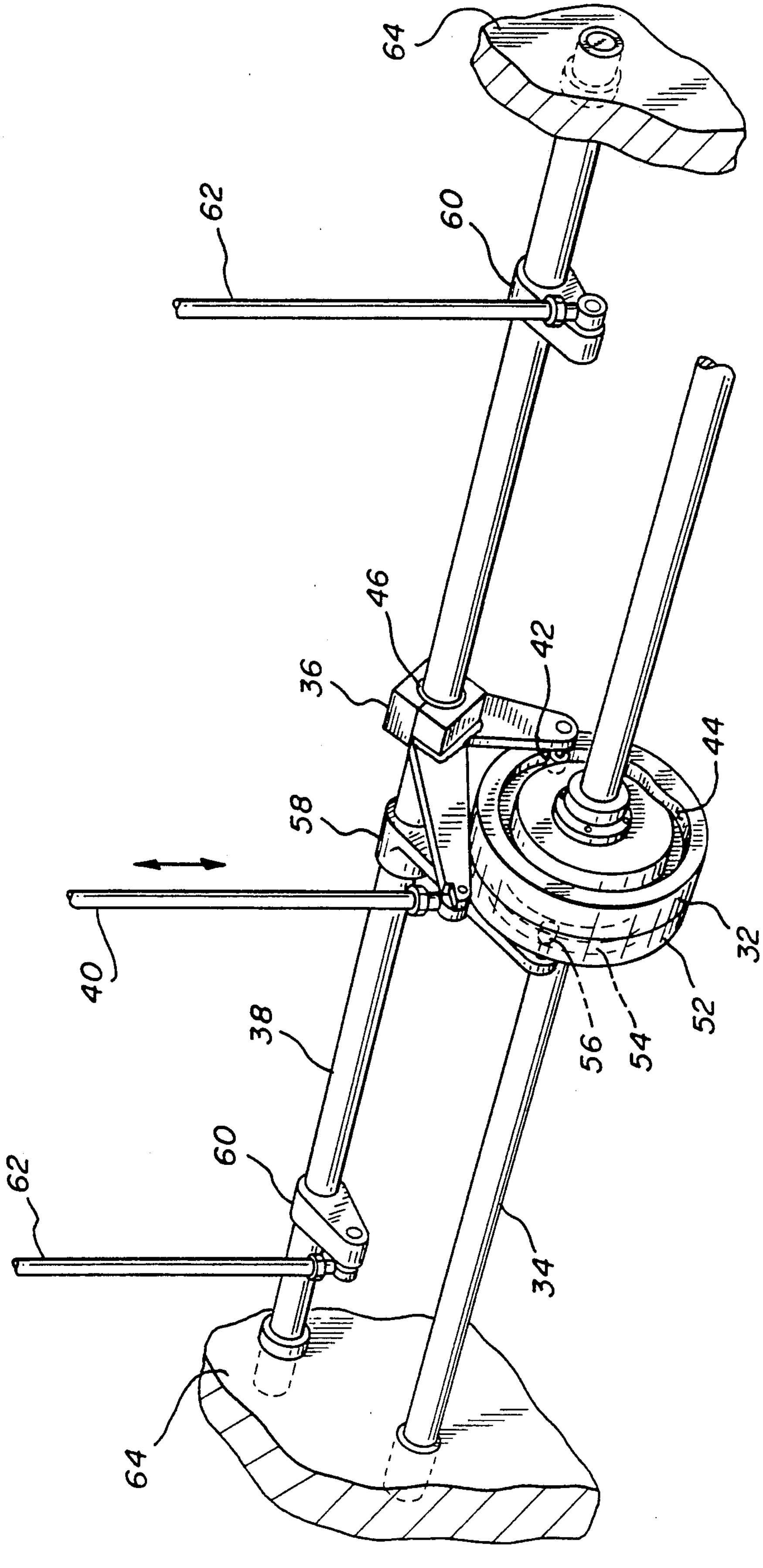
FIG. 5 is a detail perspective view of the control arm, pivot cam, pivot shaft and drive shaft of the apparatus of FIG. 3.

The controlling means 22 of the first embodiment, means 24 for pivoting, is also shown in FIG. 1. Shown in perspective in FIG. 5, the downward pivoting of stacking table 26 is preferably controlled by a drive mechanism comprising a pivot cam 32 which is rotatably driven by a drive shaft 34, and a control arm 36 which freely pivots through an arc on pivot shaft 38 by connection to pivot cam 32; and a tie rod 40, which is attached between the control arm 36 and the free end of stacking table 26. As a dual lane apparatus is preferred, tie rod 40 attaches to the free end of the stacking tables 26 by table links 41. Control arm 36 pivots through an arc by connection to a cam follower 42 which is disposed in the cam track 44 of pivot cam 32, and control arm 36 preferably further includes a bronze bushing 46 which fits around pivot shaft 38 and facilitates free pivoting of control arm 36 thereon. Thus, in sum, as the pivot cam 32 rotates, the control arm 36 pivots through an arc producing a reciprocating motion which moves tie rod 40 up and down, thereby causing the stacking table 26 to pivot up and down during a stacking cycle.

Further shown in FIG. 1, and preferred in practicing all embodiments of the present invention, the means 22 for controlling also includes means 50 for displacing vertically the supporting means 20. The vertical displacement means 50 gradually lowers the supporting means 20 vertically during the stacking process to maintain the uppermost bag 12$n$ at a generally constant level for stacking, and returns the supporting means 20 to its highest position once the stack 14 is removed. The vertical displacement means 50 includes a table cam 52 with cam track 54 which is rotatably driven by drive shaft 34, a pivot arm 58 which is connected to table cam 52 by a cam follower 56 and rigidly connected to pivot shaft 38, a pair of linkage arms 60 rigidly connected near opposite ends of pivot shaft 38 and extending therefrom, and table tie rods 62 extending upward from linkage arms 60 to opposed ends of the means 20 for supporting. As the table cam 52 rotates, pivot arm 58 moves pivot shaft 38 through an arc. Movement of pivot shaft 38 through an arc also moves linkage arms 60 through an arc, causing tie rods 62 to raise and lower the means 20 for supporting. Also shown in FIG. 1, the drive shaft 34 and the pivot shaft 38 are supported by a frame 64, and drive shaft 34 is driven by a conventional source of rotary power (not shown).

Figure 6:
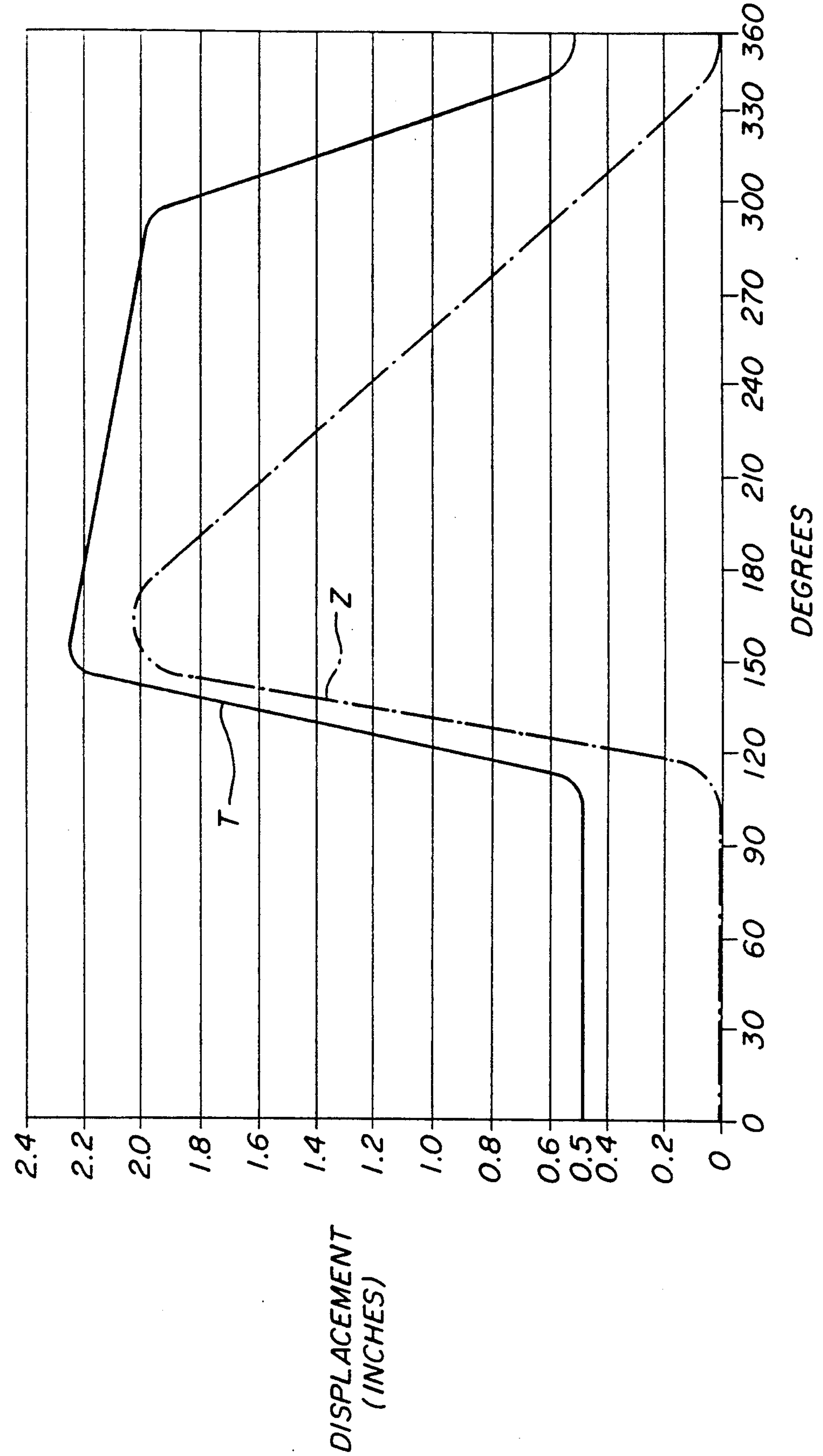
FIG. 6 is a graph of the movement of the first and second supporting means versus rotation of the first and second cams, for the embodiment of FIG. 3.

Once the timing and displacement of the means 24 for pivoting and the vertical displacement means 50 are coordinated, pivot cam 32 and table cam 52 are preferably bolted together on drive shaft 34 to maintain the relationship between pivoting and vertical displacement of the means 19 for receiving. Alternatively, pivot cam 32 and table cam 52 could be a double sided cam. FIG. 6 is a representative graph of the timing versus displacement for the third embodiment of the present invention and is more fully discussed below.

Referring now to FIGS. 2A–3 where like numbers represent like elements, in the second and third embodiments of the present invention, the supporting means 20 include first means 20*a* for supporting the nonzippered portion of the bags 12 and second means 20*b* for supporting the zippered portion of the bags 12. Further, in accordance with the second and third embodiments, the rate of downward movement of the second supporting means 20*b* is greater than the rate of downward movement of the first supporting means 20*a*. This allows the second supporting means 20*b* to move the zippered portions of the bags 12 downwardly generally faster and farther than the first supporting means 20*a* under the nonzippered portion of the bags 12.

Referring more particularly to FIGS. 2A and 2B, in accordance with the second embodiment, the first supporting means 20*a*, such as a first stacking table portion 26*a*, is pivotally mounted on the receiving means 19, and the second supporting means 20*b*, such as a stacking table end portion 26*b*, is pivotally mounted on the first supporting means 20*a*. The fingers 28 are disposed and shaped as in the first embodiment of the present invention.

In accordance with the second embodiment, the means 24 for pivoting the first and second supporting means 20*a* and 20*b* is substantially the same as that of the first embodiment, except that the table links 41 extend downward to the free end of stacking table end portion 26*b*, as shown in FIGS. 2A and 2B. FIG. 2A shows the stacking table portion 26*a* and the stacking table end portion 26*b* in their initial positions which are their highest position during the stacking cycle. As shown, the stacking table portion 26*a* is generally horizontal, while the stacking table end portion 26*b* is pivoted downward initially at an angle $\theta$ to accommodate the thicker zippered portion of the bags initially received from the count fingers 48. As they are pivoted downward, the rate of downward movement of the stacking table end portion 26*b* is greater than the rate of downward movement of the stacking table portion 26*a*. At their lowest position, shown in FIG. 2B, the stacking table portion 26*a* is pivoted to an angle $\beta$, and the stacking table portion 26*b* is pivoted to an angle $\alpha$, where $\alpha$ is greater than $\theta$.

As with the first embodiment, in accordance with the second embodiment, when the means 24 for pivoting pivots the first and second supporting means 20*a* and 20*b* downward for stacking, the vertical displacement means 50 (shown in FIG. 1) also vertically lowers the first and second supporting means 20*a* and 20*b* to maintain the uppermost bag 12*n* at a generally constant height.

Referring now to FIG. 3, in the third, most preferred embodiment of the present invention, the first supporting means 20*a*, such as a stacking table portion 26*a*, is maintained in a generally horizontal attitude. The second supporting means 20*b*, such as the last finger of the stacking table, zipper finger 66, is preferably moved downwardly by means 24 for pivoting. Preferably, the uppermost position of zipper finger 66 is displaced approximately ¼ inch below the fingers 28, as shown. As also shown in FIG. 3, stacking table portion 26*a* includes fingers 28 which extend upward from table frame 30 and which may be of any cross sectional shape. As the stacking table portion 26*a* is not pivoted during stacking, interference problems with the count fingers 48 are minimized and trouble-free transfer of the first few bags 12 from the count fingers 48 results. It is preferred to bevel the upper surface of the finger 28 adjacent to the zipper finger 66, as shown, to allow the bottom bag 12 of a stack 14 to bend more gradually towards zipper finger 66.

Figure 7:
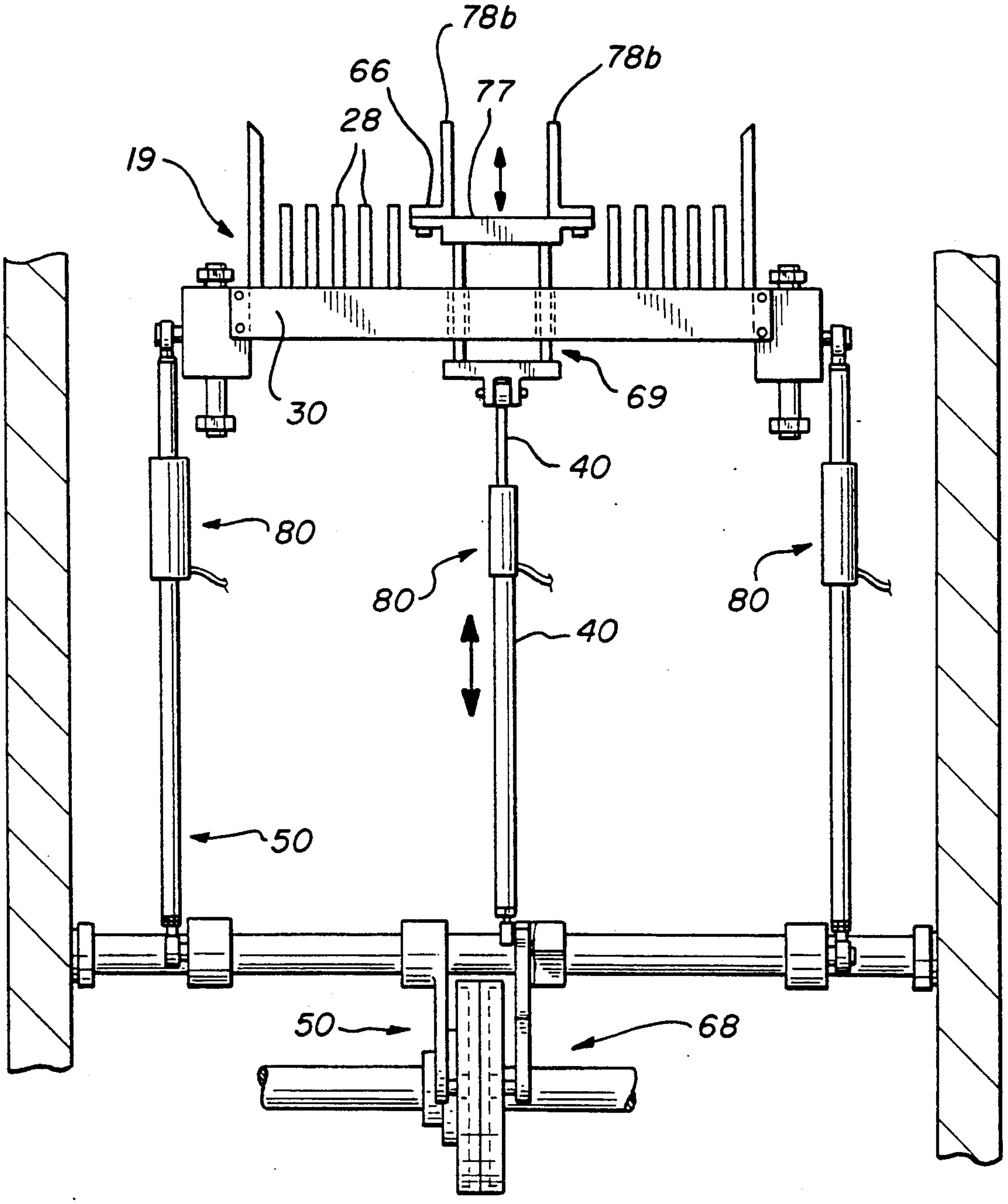
FIG. 7 is a front elevational view of alternative means for controlling the position of second means for supporting.

The means 24 for pivoting of the third embodiment may be substantially the same as that of the first or second embodiment. It is preferred, however, as shown in FIG. 3, to provide two tie rods 40 for each of the two lanes of the dual lane apparatus and use links 43 to support and pivot zipper fingers 66. As first supporting means 20*a* remains generally horizontal, operation of the means 24 for pivoting causes the zipper finger 66 to be lowered at a faster rate than the stacking table portion 26*a*. In an alternative embodiment of FIG. 3, shown in FIG. 7, the means 22 for controlling may comprise means 68 for sliding, which move zipper finger 66 linearly. As shown, the means 68 for sliding is similar in structure to the means 24 for pivoting except that a single table tie rod 40 is used, and connects to a linear motion shaft and bearing assembly 69, which supports the zipper fingers 66.

Figure 4:
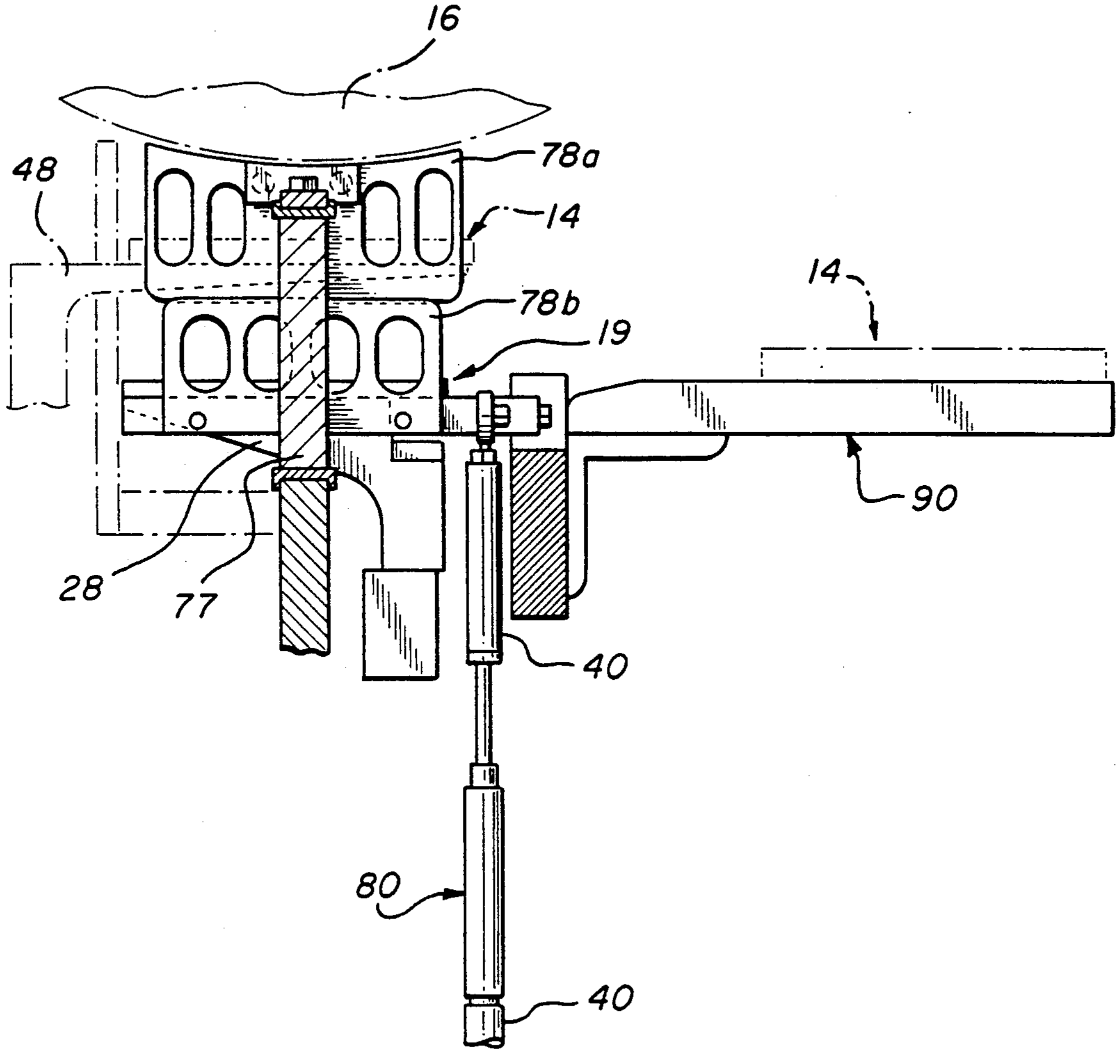
FIG. 4 is a detail cross-sectional view of the apparatus of FIG. 3 taken along line 4—4.

Referring now to FIG. 6, displacement and timing of the stacking table portion 26*a* and zipper finger 66 are shown for the preferred embodiment of FIGS. 3 and 4. The positions of the stacking table portion 26*a* and the zipper finger 66, lines T and Z, respectively, are separately graphed relative to the lowest point of the zipper finger 66. The 0 degree (°) position represents the point in the stacking cycle when the count fingers 48 fire into the stream of bags 12 to separate the stack 14 just formed from the stream. Meanwhile, bags 12 in the stream continue to stack on count fingers 48. The stack 14 is at its lowest level at this 0° position. The stack 14 is removed by a horizontal transfer mechanism (not shown) in the direction of guide 90 (representatively shown in FIG. 4) during the 0° to 110° portion of the cycle. Thereafter, the stacking table portion 26*a* and pivot finger 66 rise quickly to their maximum height where they receive the bags 12 during the 150° to 170° portion of the cycle from count fingers 48. Typically, approximately 10 bags are provided by the count fingers 48. Stacking continues on the stacking table portion 26*a* and zipper finger 66 during the 170° to 360° portion of the cycle. During stacking, the pivot finger 66 drops at a generally constant rate. Meanwhile, the stacking table portion 26*a* drops at a slower rate than zipper finger 66 through approximately the 300° to 310° position, when it accelerates its rate of displacement to prepare additional space to ensure that the count fingers 48 may fire in without contacting the stack 14. The final two or three bags 12 free-fall to the stack 14. It may be further observed from FIG. 6 that during its accelerated displacement the stacking table portion 26*a* begins to "catch" up to the zipper finger 66, raising the uppermost bag 12*n* from a substantially horizontal position. However, as the table height is lower, the packer fingers 18 avoid contact with the stack 14, and the final few bags stack without disturbing the stack 14. Thus, as may be observed from inspection of FIG. 6, while the separation between the zipper finger 66 and stacking table portion 26*a* may be much greater during stacking (for example, approximately 1.4 inches at 300°), the final position of zipper finger 66 is about 0.5 inches below the stacking table portion 26*a* at the end of the cycle. This readjustment at the end of the stacking cycle generally evens out the zippered ends and bottoms of the bags 12 in the stack 14 to facilitate horizontal transfer with a conventional mechanism.

In stacking bags 12, a typical stack of 25 zippered plastic bags may be as much as 2.0 inches or more thick at the zippered end (25 times the profile thickness, or approximately 0.08 inches/bag), while being only 0.10 to 0.20 inches thick at the opposite end (25 times the bag film thickness, or approximately 0.004–0.008 inches per bag). Typically, the bag profiles stack on the present invention in offset relationship, so that, theoretically, a 25 count stack 14 could be about 1.0 inch in thickness at the zippered end. In practice, however, additional thickness is encountered at the zippered ends of bags 12 due to waviness and other variations experienced in the bags 12 at the zippers.

Still referring to FIG. 6, it is understood that the scope of the invention encompasses changes in the absolute and relative displacements of zipper finger 66 and stacking table portion 26*a*. Increased displacement of zipper finger 66 is preferred where stacks 14 having a greater bag count, for example 30–32 bags 12 rather than 25, are desired. The higher the number of bags 12 in the stack 14, the more significant is the effect of the present invention on stacking. As well, the greater the bag size and the associated zipper profile, generally the greater the zipper finger 66 displacement needed. Some experimentation with the pivot cam 32 and table cam 52 may be desirable to optimize the displacement versus timing for the various embodiments of the present invention, and for their application to interface with various means for delivering which may be used on different bag making apparatuses. Thus, FIG. 6, which is for the preferred embodiment of FIG. 3, is representative of timing versus displacement for the present invention.

Additional features are preferred in the apparatus 10 of the present invention, regardless of the embodiment. The supporting means 20 preferably include one or more side guides 78 to help retain bags 12 thereon. Shown in FIGS. 1 and 3 are an upper side guide 78*a* and a lower side guide 78*b* for each of the lanes of bags 12 being stacked. Upper side guides 78*a* are attached to side guide support 77, while lower side guides 78*b* are attached to the end of second supporting means 20*b*. As further shown, side guide support 77 is connected to means 22 for controlling to adjust its position during stacking.

The supporting means also may include means 70 for retaining the bottom bag 12 in a stack. As representatively shown in FIG. 8, the retaining means 70 preferably comprises one or more vacuum ports 72 to secure the lips of the bottom bag 12 in a stack 14. Vacuum ports 72 are supplied with vacuum from vacuum source 71. Preferably the lips of the bottom bag 12 are secured along the last finger of the means 20 for supporting to insure that no portion of the stack 14 falls through the fingers 28 or zipper finger 66 as they move downward. For example, in FIG. 8, one or more vacuum ports 72 are preferably provided along the zipper finger 66 of second supporting means 20*b*. In addition, the vacuum ports 72 are further preferably supplied with low pressure purge air from a source of purge air 73 during the non-vacuum portion of the cycle. Purge air prevents the buildup of wax and other deposits which might plug up the vacuum ports 72. Valve 75 is used to control the supply of vacuum and purge air to vacuum ports 72.

A further additional feature includes the use of jam detection means 80 to interrupt operation of the stacking apparatus 10 in the event of a jam. As shown best in FIG. 8, such jam detection means 80 may comprise an air cylinder 82 and microswitch 84 connected in-line with tie rod 40 and table tie rods 62. Typically, the air pressure to such air cylinders 82 holds up the weight of the stacking table 26 and stack 14 forming thereon. Force in excess thereof, such as caused by a jam, compresses the air cylinder 82 sufficiently to engage microswitch 84 to turn off the apparatus 10. The use of such jam detection means 80 also provide a margin of safety in operation of apparatus 10 in the event of misadjustment which might otherwise cause components of the apparatus 10 to bend and break.

Figure 8:
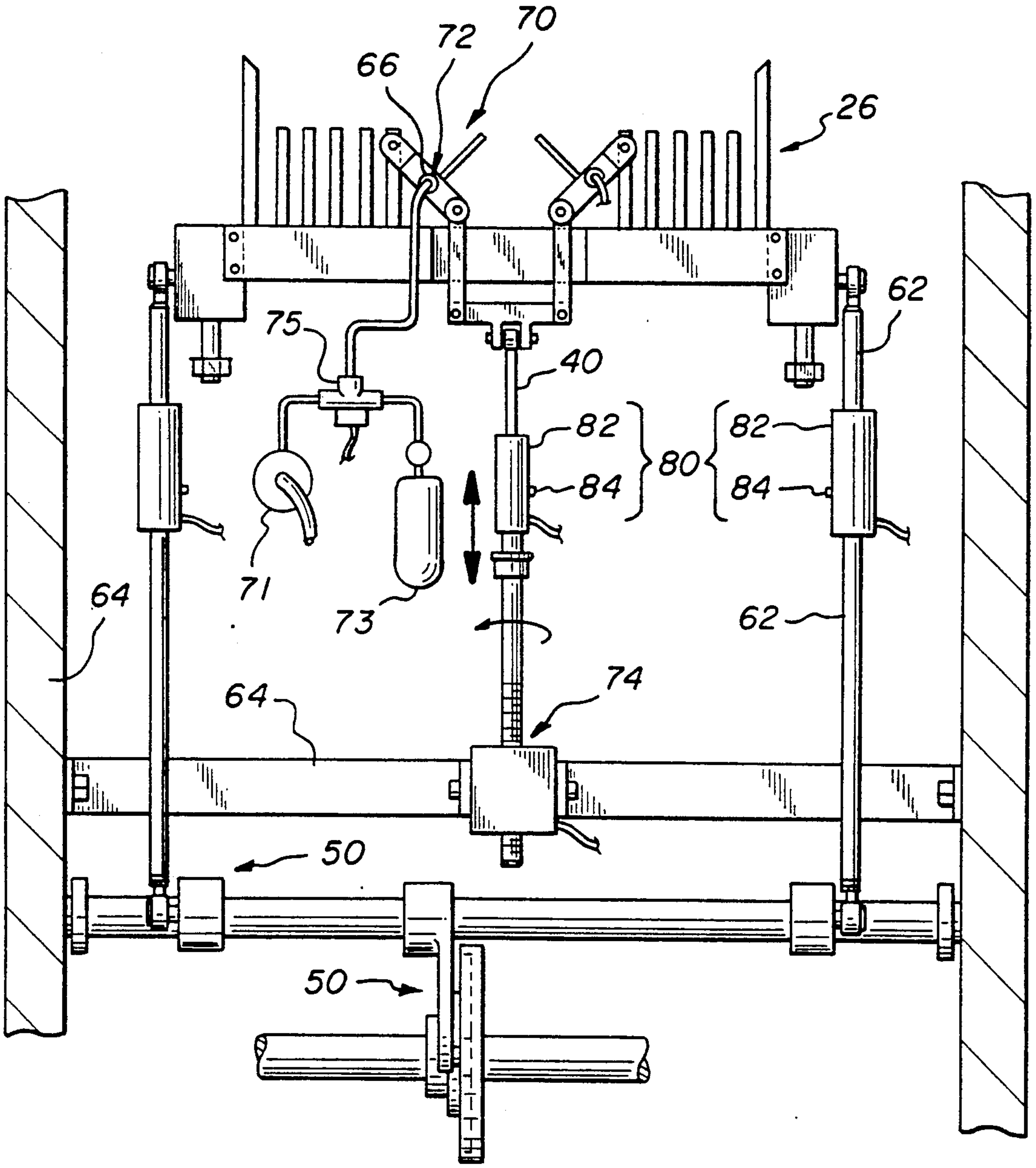
FIG. 8 is a front elevational view of an alternative drive mechanism for use in controlling the position of the means for supporting.

Also shown in FIG. 8 is an alternative embodiment of the means 24 for pivoting. The alternative means for pivoting comprises one or more programmable actuators 74, such as variable speed ball screws, which replace the pivot cam 32. Supported on frame 64, such actuators 74 permit additional timing and displacement adjustments to be made to optimize operation of the means for supporting 20 or 20*b* to provide a generally horizontal stacking surface. Programmable actuators 74 also facilitate timing and adjustment changes which may be needed to optimize operation where bag counts are changed, or where bag size or zipper profiles are changed. However, cam mechanisms are preferred for simplicity, as further timing and displacement adjustments should not be necessary after initial set-up. Separate actuators 74 make timing and displacement adjustments more complicated, and increase the chances for accidental misadjustment.

The present invention also provides a method for stacking zippered plastic bags 12 in a generally horizontal relationship. The method includes the steps of delivering a series of individual zippered bags 12 to a delivery point A; receiving the bags 12 at the delivery point A with a means 19 for receiving, where the receiving means 19 includes a means 20 for supporting the bags 12; stacking the bags 12 on the receiving means 19; and controlling the position of the supporting means 20 so that the uppermost bag 12 of the stack 14 is maintained in a substantially horizontal position at the delivery point A. Thus, as the bags 12 are delivered to the delivery point A, each of the bags 12 in the series of bags forming the stack 14 is, in turn, maintained in a substantially horizontal position at the delivery point A. The uppermost or last bag in the series on the stack is maintained in a substantially horizontal position at the delivery point, while other bags below it in the stack may begin to vary in position from substantially horizontal.

In accordance with the method of the present invention, practiced with the first embodiment where the supporting means 20 is pivotally mounted on the receiving means 19, the step of controlling the position of the supporting means 20 further comprises the step of pivoting the supporting means 20 downwardly.

In accordance with the method of the present invention, practiced with the second and third embodiments where the supporting means 20 include first and second means 20*a* for supporting, the step of controlling the position of the supporting means 20*a*, 20*b* further comprises the step of controlling the rate of downward movement of the second supporting means 20*b* such that it is greater than the rate of downward movement of the first supporting means 20*a*.

Further, in the method practiced with the second embodiment, where the second supporting means 20*b* is pivotally mounted on the first supporting means 20*a*, the step of controlling the rate of downward movement includes the steps of pivoting the first supporting means 20*a* downwardly, and pivoting the second supporting means 20*b* downwardly from said first supporting means 20*a*.

In accordance with the method of the present invention, practiced with the third, most preferred embodiment of the present invention, where the first supporting means 20*a* remains substantially horizontal, the step of controlling the rate of downward movement includes the step of moving the second supporting means 20*b* downward with means 24 for pivoting, while moving both the first supporting means 20*a* downward with the vertical displacement means 50.

It is understood that the steps of the method of the present invention may be defined further in accordance with the operation of the apparatus, in its various embodiments and with its various alternative means, the operation of which are described in detail above.

While certain representative embodiments and details have been shown for purposes of illustrating the invention, it will be apparent to those skilled in the art that various changes in the apparatus and method disclosed herein may be made without departing from the scope of the invention, which is defined in the appended claims.

What is claimed is:

1. An apparatus for stacking zippered plastic bags in a generally horizontal relationship comprising:

means for delivering a series of individual zippered plastic bags having zippered and nonzippered portions to a delivery point, said means for delivering including a transfer drum;

means at said delivery point for receiving successive zippered plastic bags in a stacked relationship, said receiving means including means for supporting said bags; and means for controlling the position of said means for supporting such that as said bags are delivered to said delivery point, at least the uppermost bag in said series of bags on the stack, including both said zippered and nonzippered portions, is maintained in a substantially horizontal position at said delivery point.

2. The apparatus of claim 1, wherein said means for supporting are pivotally mounted on said receiving means, and said controlling means include means for pivoting at least a portion of said means for supporting to maintain the uppermost in said series of bags on the stack in a substantially horizontal position at said delivery point.

3. The apparatus of claim 1 wherein said means for controlling includes means for displacing vertically said means for supporting.

4. The apparatus of claim 1 wherein said means for supporting include first means for supporting said nonzippered portion of said bags and second means for supporting said zippered portion of said bags.

5. The apparatus of claim 4 wherein said means for controlling includes means for displacing vertically said means for supporting, and wherein the rate of downward movement of said second means for supporting is greater than the rate of downward movement of said first means for supporting.

6. The apparatus of claim 4, wherein said first means for supporting are pivotally mounted on said receiving means, and said second means for supporting are pivotally mounted on said first means for supporting, and said means for controlling include means for pivoting said second means for supporting downwardly.

7. The apparatus of claim 4 wherein said first means for supporting are mounted on said means for receiving in a generally horizontal position and said second means for supporting are pivotally mounted on said first means for supporting, and said means for controlling include means for pivoting said second means for supporting downwardly.

8. The apparatus of claim 4 wherein said first means for supporting are mounted on said means for receiving in a generally horizontal position and said second means for supporting are slidably mounted on said receiving means, and said means for controlling includes means for sliding said second means for supporting downwardly.

9. The apparatus of claim 4 wherein said second means for supporting comprises at least one finger adapted to support said bags.

10. The apparatus of claim 4 wherein said means for controlling further includes means for displacing vertically said first means for supporting.

11. The apparatus of claim 1 wherein said apparatus further includes a vacuum source and said means for supporting includes at least one vacuum port in communication with said vacuum source for releasably securing at ,least a portion of the bottom bag of said stack to said means for supporting.

12. The apparatus of claim 11 wherein said means for supporting include first means for supporting said nonzippered portion of said bags and second means for supporting said zippered portion of said bags, and said at least one vacuum port is disposed on said second means for supporting.

13. The apparatus of claim 11, wherein said apparatus further includes:

a source of positive pressure purge air in communication with said vacuum port; and a valve having a first position in which said vacuum source is in communication with said vacuum port and a second position in which said source of positive pressure purge air is in communication with said vacuum port;

whereby when said valve is in said second position, said vacuum port is provided with positive pressure purge air to prevent the buildup of deposits in said vacuum port.

14. The apparatus of claim 1, wherein said means for supporting comprises a stacking table having a frame and a plurality of fingers in spaced relationship extending therefrom to support bags delivered thereto.

15. The apparatus of claim 14 wherein said means for supporting include first means for supporting said nonzippered portion of said bags and second means for supporting said zippered portion of said bags, and said second means for supporting comprises at least one of said fingers.

16. The apparatus of claim 1, wherein said means for controlling the position of said means for supporting such that the uppermost bag in said series of bags on the stack is maintained in a substantially horizontal position comprises:

at least one a drive mechanism to produce cyclical motion during a stacking cycle; and at least one tie rod connected to said at least one drive mechanism and extending therefrom for connection to at least one end of said means for supporting;

whereby the position of said means for supporting is controlled to maintain at least the uppermost bag in a series of bags on the stack in a substantially horizontal position at said delivery point.

17. The apparatus of claim 16 wherein said drive mechanism comprises:

a drive shaft rotatably mounted in said apparatus;

a pivot cam including a cam track rotatably driven by connection thereto;

a pivot shaft mounted in said apparatus; and a control arm rotatably disposed on said pivot shaft, said control arm including a cam follower slidably disposed in said cam track to reciprocate said control arm through an arc during a stacking cycle, and said control arm attached to said at least one tie rod.

18. The apparatus of claim 16 wherein said drive mechanism comprises a programmable actuator disposed in said apparatus and connected to said tie rod.

19. The apparatus of claim 2 wherein said means for controlling further comprises means for detecting a jam connected to said means for pivoting.

20. An apparatus for stacking zippered plastic bags in a generally horizontal relationship comprising:

means for delivering a series of individual zippered plastic bags to a delivery point, said means for delivering including a transfer drum;

means at said delivery point for receiving successive zippered plastic bags in a stacked relationship, said receiving means including first and second means for supporting said bags, wherein said first means for supporting is mounted to said means for receiving and said second means for supporting is pivotally mounted to said first means for supporting; and means for controlling the position of said first and second means for supporting such that as said bags are delivered to said delivery point, at least the uppermost bag in said series of bags on the stack is maintained in a substantially horizontal position at said delivery point, wherein said means for controlling comprises means for displacing vertically downward said first means for supporting, and means for pivoting said second means for supporting downwardly;

whereby a rate of downward movement of said second means for supporting is generally greater than a rate of downward movement of said first means for supporting.

21. A method for stacking zippered plastic bags in a generally horizontal relationship comprising the steps of:

delivering a series of individual zippered plastic bags having zippered and nonzippered portions to a delivery point;

providing a receiving means at said delivery point, said receiving means including a means for supporting;

stacking successive zippered plastic bags on said receiving means;

controlling the position of said means for supporting such that as said bags are delivered to said delivery point, at least the uppermost bag in said series of bags on the stack, including both said zippered and nonzippered portions, is maintained in a substantially horizontal position at said delivery point.

22. The method of claim 21, wherein said means for supporting are pivotally mounted on said receiving means, and said step of controlling comprises pivoting at least a portion of said means for supporting to maintain at least the uppermost bag in a series of bags in a substantially horizontal position at said delivery point.

23. The method of claim 22 wherein said step of controlling further comprises the step of displacing vertically said means for supporting.

24. The method of claim 21 wherein said means for supporting include first means for supporting said nonzippered portion of said bags and second means for supporting said zippered portion of said bags, and said step of controlling comprises the step of controlling the downward movement of at least said second means for supporting.

25. The method of claim 24 wherein said step of controlling comprises the step of controlling the rate of downward movement of both said first and second means for supporting such that the rate of downward movement of said second means for supporting is greater than the rate of downward movement of said first means for supporting.

26. The method of claim 25 wherein said step of controlling comprises the step of pivoting downwardly both said first and second means for supporting.

27. The method of claim 25 wherein said step of controlling comprises the steps of:

pivoting said second means for supporting downwardly; and displacing said first means for supporting vertically downward.

28. The method of claim 21 wherein said step of controlling comprises the step of retaining the first bag of a series of bags delivered for stacking on said means for supporting by means of at least one vacuum port disposed in said means for supporting.

29. The method of claim 21 wherein said step of controlling comprises adjustably controlling the position of said means for supporting by means of a programmable actuator.

* * * * *